Sept. 18, 1928.
E. S. MARKS
1,684,773
VIBRATION ABSORBING ELEMEN
Filed May 12, 1926
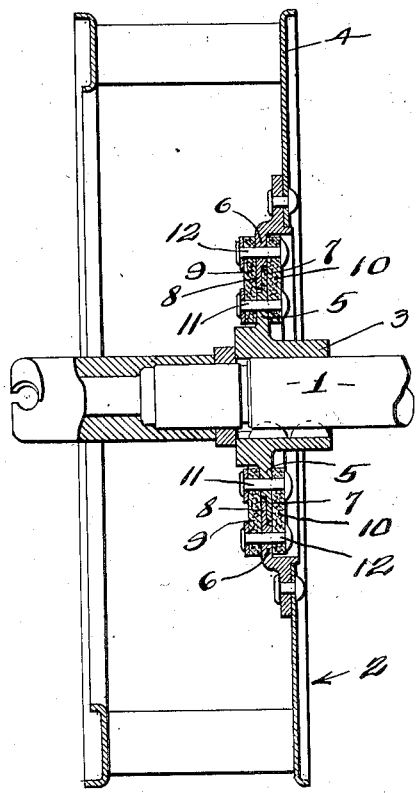
INVENTOR.
Edward S. Marks
BY Parsons + Bodell
ATTORNEYS.

Patented Sept. 18, 1928.

1,684,773

UNITED STATES PATENT OFFICE.

EDWARD S. MARKS, OF SYRACUSE, NEW YORK, ASSIGNOR TO H. H. FRANKLIN MANUFACTURING COMPANY, OF SYRACUSE, NEW YORK, A CORPORATION OF NEW YORK.

VIBRATION-ABSORBING ELEMENT.

Application filed May 12, 1926. Serial No. 108,503.

This invention relates to means for deadening or absorbing the vibration of rotating elements as various kinds of wheels mounted on shafts, which means is particularly simple and economical in construction and highly efficient in use.

It is particularly advantageous for deadening the shocks or vibrations from the crank shaft of an automobile engine to the fly wheel, fan or other wheel mounted on the crank shaft.

1 designates the shaft and 2 the wheel mounted on the shaft, this wheel being the rotor of a centrifugal fan or blower for circulating air over the cylinders of an engine to cool the same. The wheel 2 comprises a hub 3 mounted on the shaft to rotate therewith, an outer rim portion 4 and means connecting the hub and the rim to absorb the shocks and noises or deaden the vibration from the crank shaft.

As here illustrated the hub is formed with an outwardly extending annular flange 5 and the rim 4 is also formed with an inwardly extending annular flange 6, these flanges lapping each other and the lapping portions 7 and 8 being reduced so that the combined width thereof is the same as that of the remainder of said flanges and the outer faces of the disks are flush. The sound and vibrations are absorbed or deadened by webs of fibrous material mounted on opposite sides of the flanges and the lapping portions thereof and clamping toward each other and onto said flanges.

These webs are here shown as flat rings or disks 9 and 10 of a fibrous material, they being clamped onto the flanges 5 and 6 as by rivets 11 and 12, one set of rivets extending through said rings and the flange 5 on the hub and the other set through the flange 6 on the rim and the rings and the lapping portions 7 and 8 are located between the rivets.

By this construction the wheel is held practically in alinement and shocks and vibrations are absorbed or deadened by the fibrous disks which, although they are comparatively stiff neutralize or absorb the vibrations of the metal parts.

What I claim is:—

1. The combination of a rotatable shaft and rotatable wheel comprising a hub mounted on the shaft and having an outwardly extending annular flange, a rim having an inwardly extending annular flange lapping the former flanges, the lapping portions of the flanges being reduced in thickness so that the outer surfaces of the flanges are substantially flush, disks of fibrous material mounted on opposite sides of the flanges and the lapping portions thereof, fastening means extending through the flange on the hub and the disks, additional fastening means extending through the flange on the rim and the disks, the lapping portions of the flanges being located between said fastening means.

2. The combination of a rotatable shaft and a rotatable member having a hub fixed to the shaft to rotate therewith, a rim, the hub and the rim being provided with external and internal annular flanges the flanges having reduced portions which lap each other with the outer faces of the flanges substantially flush and vibration absorbing means overlying the flush faces and secured to the flanges.

In testimony whereof I have hereunto signed my name, at Syracuse, in the county of Onondaga and in the State of New York, this 30th day of April, 1926.

EDWARD S. MARKS.